United States Patent [19]
Kraus et al.

[11] 4,453,427
[45] Jun. 12, 1984

[54] INFINITELY VARIABLE TRACTION ROLLER TRANSMISSION

[75] Inventors: Charles E. Kraus; Paul L. Horton, both of Austin, Tex.

[73] Assignee: Excelermatic Inc., Austin, Tex.

[21] Appl. No.: 350,187

[22] Filed: Feb. 19, 1982

Related U.S. Application Data

[63] Continuation-in-part of Ser. No. 168,521, Jul. 14, 1980, abandoned.

[51] Int. Cl.³ ............................................. F16H 15/08
[52] U.S. Cl. ..................................... 74/200; 74/190.5; 74/208
[58] Field of Search .................... 74/190.5, 199, 200, 74/201, 206, 208, 194

[56] References Cited

U.S. PATENT DOCUMENTS

| 2,493,571 | 1/1950 | Chilton | 74/200 |
| 3,184,983 | 5/1965 | Kraus | 74/200 |
| 3,261,220 | 7/1966 | Kraus | 74/200 |
| 3,810,398 | 5/1974 | Kraus | 74/200 |
| 4,086,820 | 5/1978 | Kraus et al. | 74/200 |
| 4,275,610 | 6/1981 | Kraus | 74/201 |

Primary Examiner—Leslie A. Braun
Assistant Examiner—Michael D. Bednarek
Attorney, Agent, or Firm—Klaus J. Bach

[57] ABSTRACT

An infinitely variable traction roller transmission has traction rollers arranged between toric discs which are forced toward each other for engagement with the traction rollers for the transmission of power. The traction rollers are mounted on pivotal support structures which are supported on tension sheets extending, and balancing the forces effective, therebetween. The tension sheets are held in position by guide blocks extending from the housing into openings in the tension sheets and permitting tilting of the tension sheet to permit axial movement of the roller support structures in opposite directions for initiation of a change of the transmission ratio.

13 Claims, 5 Drawing Figures

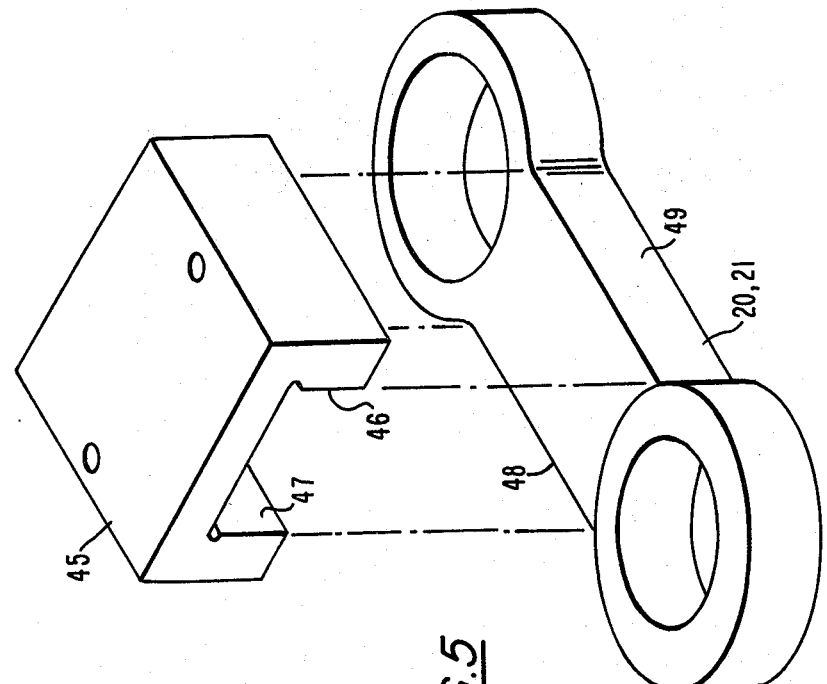
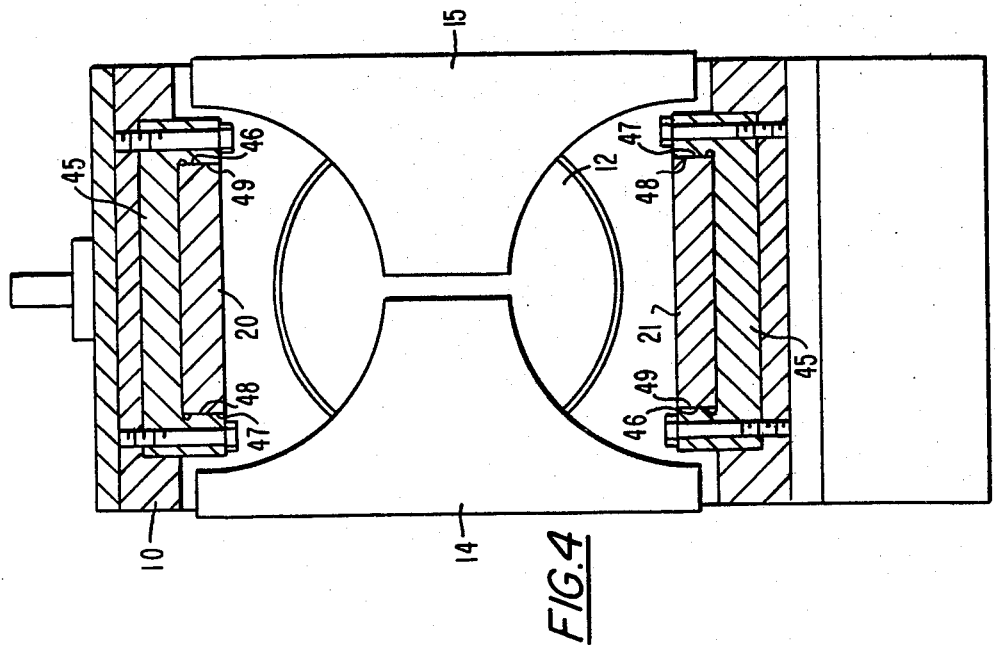

4,453,427

INFINITELY VARIABLE TRACTION ROLLER TRANSMISSION

This is a continuation-in-part application of application Ser. No. 168,521 filed July 14, 1980 now abandoned.

BACKGROUND OF THE INVENTION

The invention relates to an infinitely variable traction roller transmission in which motion transmitting traction rollers are disposed between, and in engagement with, opposite toric discs mounted on input and output shafts.

To enable such toroidal traction roller transmissions to transmit large torques, large engagement forces between the toric discs and the traction rollers are necessary, which forces are generally obtained by forcing the toric discs toward each other and into firm engagement with the traction rollers therebetween. The engagement forces depend on, and are generated by, the torque transmitted through the transmissions. This, however, results in a large axial thrust load of the traction rollers and the support structure for the rollers.

In order to avoid that the transmission housing has to carry this load, opposite roller support structures have been interconnected by tension sheets which take up the opposing forces applied to the traction rollers during operation of the transmission. Furthermore, this arrangement—as claimed and disclosed in this applicant's U.S. Pat. No. 3,810,398—prevents excessive vibration from being transmitted to the transmission housing as the tension sheets balance the forces and, furthermore, provide for a limited freedom of movement of the roller support structure relative to the transmission housing.

In a present design and as shown in U.S. Pat. No. 4,086,820, the tension sheets are anchored to the transmission housing which, although this permits flexure of the tension sheets, provides for no freedom of movement of a tension sheet as a whole. The tension sheets therefore determine the position of the roller support structure, that is the position of the traction rollers, which in turn determines the position of the toric disc shafts. Although there is normally sufficient bearing clearance it has been found that the traction roller support structures do not have sufficient axial freedom, at least not under light loads. As a result light load or no load losses are relatively high and are dependent on the tolerances.

For best light load efficiency, both disc shafts ought to be supported on anti-friction bearings which do not allow axial movement of the shafts. Therefore, the traction roller support structure should be so mounted that slight position adjustment is possible for the traction roller support structures to find the true geometric center of the traction rollers with regard to the traction discs and movement necessary to find such center should not be restricted by forces applied to the traction roller support structure through the tension sheets from the housing or the opposite traction roller support structure connected to the same tension sheets.

SUMMARY OF THE INVENTION

In an infinitely variable traction roller transmission in which power transmitting traction rollers are disposed between toric discs with which they are held in engagement for the transmission of power, the traction rollers are supported on support structures which are pivotally mounted to permit a change of transmission ratio. The forces on the traction roller are balanced by tension sheets extending between the traction roller support structures. The tension sheets are held in position by guide means extending from the housing and engaging the tension sheets but permitting movement of the tension sheets relative to the transmission housing.

BRIEF DESCRIPTION OF THE DRAWINGS

FIG. 4 is a view, similar to FIG. 2, showing however an alternative guide means for the tension sheet; and FIG. 5 is an exploded view of the alternative guide means and tension sheet of FIG. 4.

DESCRIPTION OF THE PREFERRED EMBODIMENT

For a description of the details of a traction roller transmission of the type with which the present invention is concerned and for a description of its operation, reference is made to U.S. Pat. No. 4,086,820.

Figure 1:
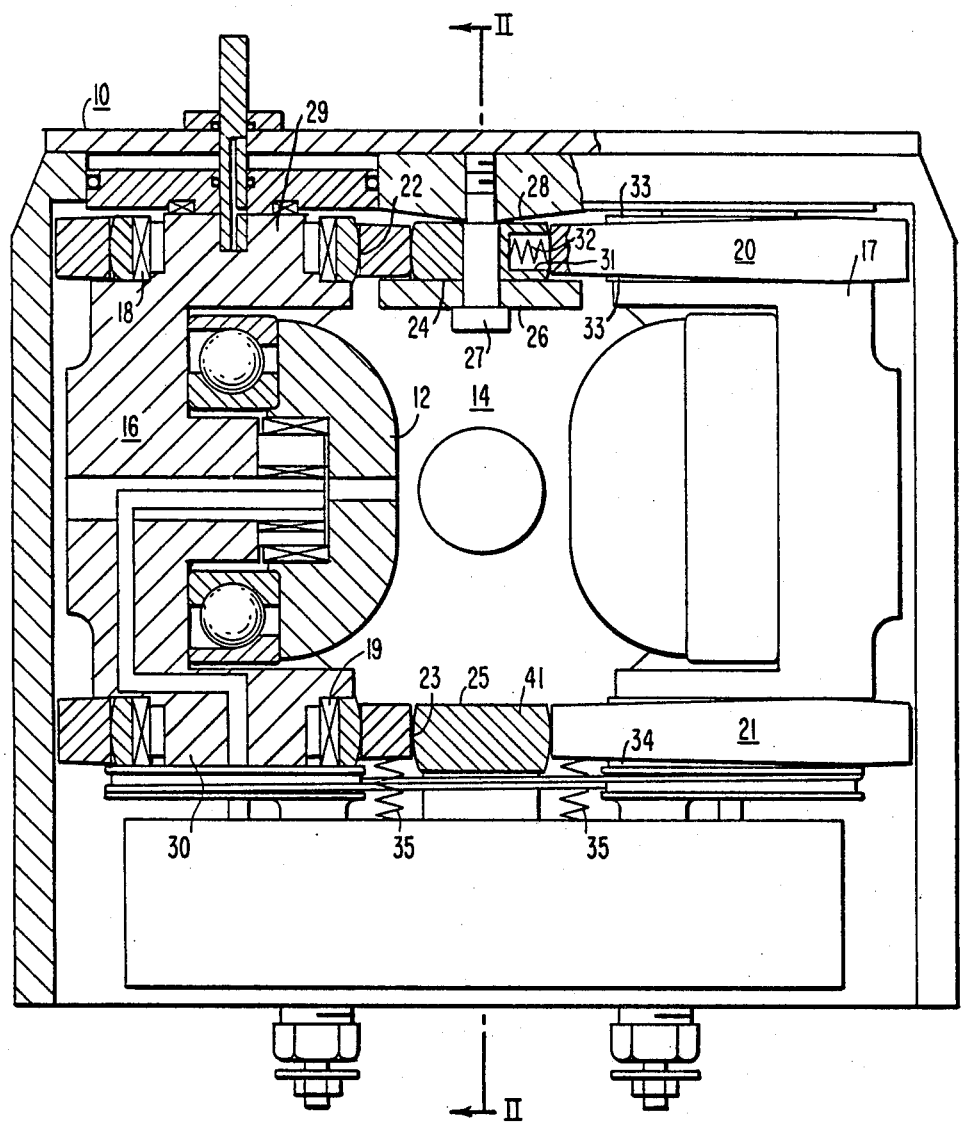
FIG. 1 is a cross-sectional view of the traction roller transmission showing the arrangement of the elements of the transmission.
Figure 3:
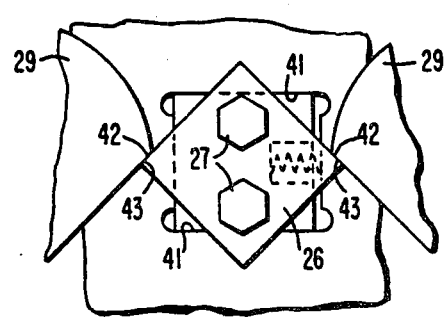
FIG. 3 is a cross-sectional view along line III—III of FIG. 1 showing the arrangement of the retaining plate for one of the tension sheets, which retaining plate also forms the stops for the pivotal end positions of the traction roller support structures.

As shown in FIG. 1, such a transmission consists essentially of a housing 10 in which traction rollers 12 are disposed between, and in engagement with, toroidal discs 14, 15 which are rotatably supported in the housing 10 on input shafts 13, 13' and forced toward each other with a force depending on the torque transmitted through the transmission. The traction rollers 12 are supported by roller support structures 16 and 17, only the support structure 16 being shown detailed and in cross-section. The roller support structures 16 and 17 are pivotally supported by means of bearings 18, 19 on tension sheets 20, 21 which balance radial forces between the opposite support structures 16 and 17. The tension sheets 20 and 21 have in the center between the support structures 16 and 17 openings 22 and 23 which receive tension sheet guide blocks 24 and 25 for positioning the tension sheets. One of the guide blocks, guide block 24 as shown in FIG. 1, is provided with a stop member 26 (see also FIG. 3) which is mounted to the housing 10 by two bolts 27 extending therethrough and through the guide member 24 in order to axially locate the traction roller support structures 16 and 17. Adjacent the guide block 24 the housing 10 is slightly wedged or has a projection 28 to provide some clearance for permitting slight pivoting of the tension sheet 20. To further facilitate such pivoting the bearings 18 and 19 on the trunnions 29 and 30 of the roller support structures 16, 17 are slightly curved, that is spherical. The stop member 26 is loosely fitted on the bolts 27 so as to provide for some float to permit increased tilting of the tension sheet when a rapid speed change is called for. The guide block 24 further has an opening 31 receiving a spring 32 which abuts the tension sheet for constant engagement between the guide block 24 and the tension sheet 20.

The guide block 25 engaging the tension sheet 21 at the other end of the roller support structures is slightly curved to facilitate tilting of the tension sheet 21, and for the same purpose, both tension sheets 20 and 21 are narrower at their center portions than they are at their opposite ends thereby providing gaps 33, 34 permitting limited tilting of the tension sheets 20, 21 about the guide blocks 24, 25.

Preferably, the transmission is, during operation, so arranged that the roller support structures are in a vertical position such that the tension sheet 20 is at the top and the tension sheet 21 is at the bottom end of the transmission. Then, support springs 35 are disposed between the housing 10 and the tension sheet 21, which springs 35 are selected to provide a combined force corresponding to the weight of the traction rollers 12 and support structures 16 and 17 thereby balancing their weight.

Figure 2:
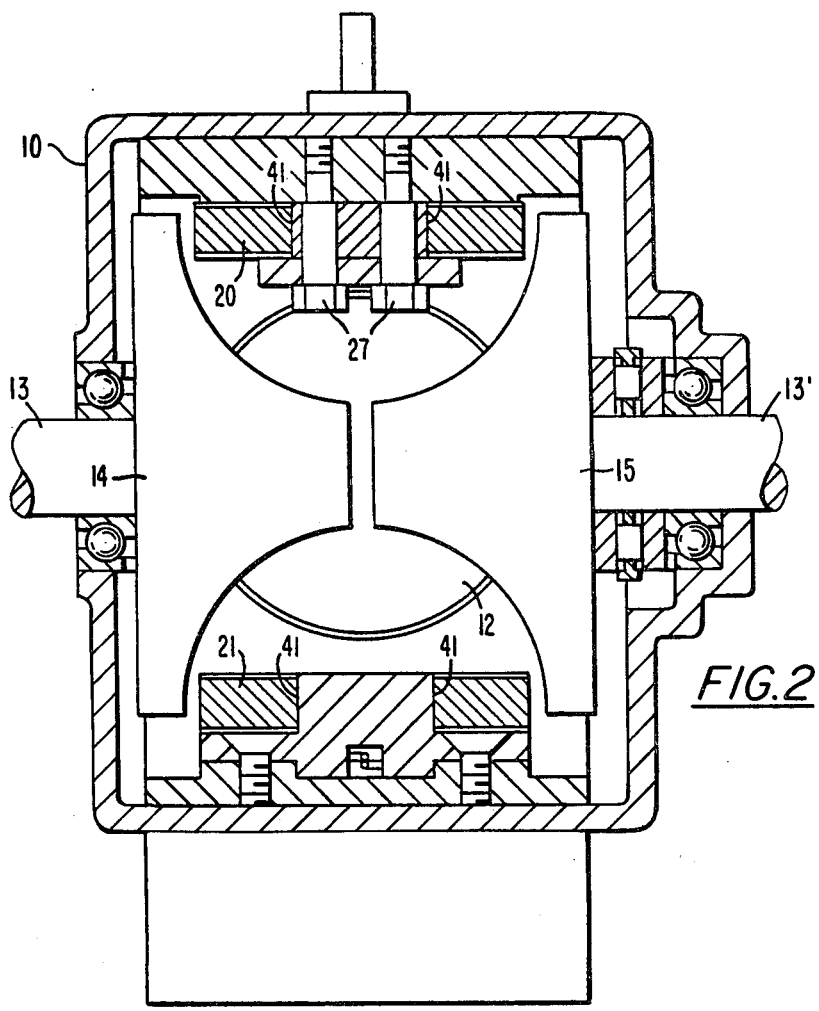
FIG. 2 is a cross-sectional view along line II—II of FIG. 1.

The front and back surfaces 41 of the guide blocks 24 and 25 as presented in FIG. 1 are flat as can be seen from FIG. 2 and fitted into the openings 22 and 23 of the tension sheets 20 and 21 so that the tension sheets remain securely aligned while providing freedom of axial movement for the traction roller support structures 16 and 17.

The stop member 26 preferably has stops 42 (FIG. 3) and the trunnions 29 have abutment surfaces 43 which limit pivoting of the traction roller support structures 16, 17 to a largest angle, that is to the greatest transmission ratio position for which the particular transmission is designed. However, stop member 26 is mounted by the bolts 27 with slight rotational freedom to insure that both traction roller support structures are in abutment with the stop member when in their end positions.

With the arrangement as described herein, no force restrictions are imposed on the traction roller support structures which are therefore very responsive to speed change demands. Furthermore the structure is relatively simple and easy to manufacture and to assemble. Finally, it may be noted that transmissions of the type described operate efficiently and quietly and they are substantially vibration-free.

In the arrangement as shown in FIGS. 4 and 5, the tension sheets are guided on the outer edges in order to facilitate machining of the guide surfaces. Preferably, a U-shaped guide member 45 is mounted on the housing 10, with opposite parallel guide surfaces 46, 47 formed on the legs of the U-shaped guide member 45. The tension sheets 20 and 21 are provided with side surfaces 48, 49 and are received in the U-shaped members 45 such that the tension sheets 20, 21 are slidably supported in the guide members 45.

What is claimed is:

1. A traction roller transmission comprising: a housing; coaxial input and output toric elements rotatably supported in said housing and being arranged opposite each other such that a toric cavity is formed therebetween; motion transmitting traction rollers disposed in said toric cavity in radial symmetry with respect to the axis of said input and output toric elements and in engagement with said opposite toric elements for the transmission of motion therebetween; a support structure for each said motion transmitting traction roller; and tension sheets extending between and interconnecting said support structures for balancing forces applied to said traction rollers, said tension sheets each having a center portion and a guide structure associated therewith in the center portion thereof, said guide structure including on said tension sheets, parallel planar side surfaces extending normal to the axis of said toric discs and guide blocks being substantially rectangular in cross-section and including a pair of slightly curved side wall surfaces slidably engaging the parallel planar side surfaces of the respective tension sheet so as to retain the tension sheet in alignment between said toric discs but permitting tilting of the tension sheet for axial precess movement of the support structures interconnected thereby.

2. A transmission as recited in claim 1, wherein said traction roller support structures have trunnions disposed in bearing structures supported in openings in the end portions of said tension sheets, said bearing structures and said tension sheets having support surfaces which are curved relative to each other so as to facilitate axial movement of said traction roller support structures while being supported by said tension sheets.

3. A transmission as recited in claim 1, wherein one of said tension sheets is held in a predetermined position by said guide means by a stop member mounted on, and projecting above, said one tension sheet, the guide means of the other tension sheet being adapted to permit relative axial floating movement of said tension sheet.

4. A transmission as recited in claim 3, wherein said transmission, when set up for operation in a position in which said traction roller support structures extend vertically and said tension sheets extend horizontally, and wherein support spring means are provided engaging the traction roller, traction roller support structure and tensions sheet assembly so as to provide a combined support force corresponding to the weight of said assembly to balance said assembly.

5. A transmission as recited in claim 4, wherein said first guide means is disposed at the top, and engages the upper tension sheet and said second guide means is disposed at the bottom and engages the lower tension sheet, said support spring means being arranged between the housing and said lower tension sheet.

6. A transmission as recited in claim 3, wherein each of said tension sheets has a guide opening in a center portion thereof and said guide blocks extend into the respective guide openings in said tension sheets, at least one of said guide blocks having retaining means for retaining said tension sheet in engagement with said guide block but permitting bending and pivoting of said tension sheets relative to said housing.

7. A transmission as recited in claim 6, wherein said tension sheets are plate members, the guide openings in said tension sheets are slightly larger than said guide blocks and said guide blocks have openings with springs therein engaging said tension sheet from one side for engagement thereof with said guide block at the other side.

8. A transmission as recited in claim 6, wherein said guide blocks have slightly curved pivotal support surfaces to facilitate pivoting of the tension sheets thereon.

9. A transmission as recited in claim 6, wherein said stop member has edge portions extending beyond said guide block and forming stops for said traction roller support structures to limit the pivotal end positions thereof.

10. A transmission as recited in claim 6, wherein said stop member is so supported as to provide a predetermined limited clearance for the respective tension sheet thereby to limit axial travel of said traction roller support structures and the rate of transmission ratio change.

11. A transmission as recited in claim 9, wherein said stop member is so supported as to provide limited pivotal float for said tension sheet thereby permitting slight axial overtravel of the traction roller support structures during an emergency ratio change.

12. A transmission as recited in claim 9, wherein said stop member is supported with slight rotational freedom so as to insure abutment of both traction roller support structures with the stop member when in their end position.

13. A transmission as recited in claim 1, wherein said guide block is a U-shaped member having legs with opposite parallel guide surfaces which slidably receive therebetween said tension sheet.

* * * * *